(12) United States Patent
Zähe (10) Patent No.: US 6,640,830 B2
(45) Date of Patent: Nov. 4, 2003

(54) PILOT OPERATED PRESSURE VALVE

(75) Inventor: Bernd Zähe, Linnich (DE)

(73) Assignee: Sun Hydraulics Corp., Sarasota, FL (US)

( * ) Notice: Subject to any disclaimer, the term of this patent is extended or adjusted under 35 U.S.C. 154(b) by 125 days.

(21) Appl. No.: 10/015,331

(22) Filed: Dec. 12, 2001

(65) Prior Publication Data

US 2003/0106588 A1 Jun. 12, 2003

(51) Int. Cl.[7] .............................................. G05D 16/10
(52) U.S. Cl. ...................................... 137/491; 137/494
(58) Field of Search ................................ 137/491, 494, 137/514

(56) References Cited

U.S. PATENT DOCUMENTS

| | | | | |
|---|---|---|---|---|
| 4,653,527 A | * | 3/1987 | Kosarzecki | 137/494 |
| 4,742,846 A | * | 5/1988 | DiBartolo | 137/514.5 |
| 4,795,129 A | * | 1/1989 | Clark | 251/62 |
| 5,050,636 A | * | 9/1991 | Sagawa et al. | 137/494 |
| 5,381,823 A | * | 1/1995 | DiBartolo | 137/494 |
| 6,039,070 A | * | 3/2000 | Zaehe | 137/491 |
| 6,119,722 A | * | 9/2000 | Zaehe | 137/494 |

* cited by examiner

Primary Examiner—Michael Powell Buiz
Assistant Examiner—Ramesh Krishnamurthy
(74) Attorney, Agent, or Firm—Charles J. Prescott (57) ABSTRACT

A pilot operated pressure valve which limits the rate of start-up pressure rise ("soft start-up") and substantially eliminates excessive system pressure spikes. The valve includes an inlet, a hollow cylindrical main body sealingly connected at one end thereof to the inlet, a pilot chamber having a sleeve slidably mounted within the main body and an operating pressure adjustment connected to another end of the main body adjacent another end of the pilot chamber for varying the threshold operating pressure of the valve. A main chamber receives pressurized fluid metered through a main orifice and discharges pressurized fluid through a damping orifice when the main chamber is filled and fluid inlet pressure exceeds the inlet threshold pressure which is just sufficient to open a spring biased pilot ball downstream of the damping orifice. An exit port upstream of the main orifice will open for discharging pressurized fluid from the valve back to a supply tank when inlet pressure exceeds the maximum operating pressure setting of the valve. Pressurized fluid is also metered from the pilot chamber into a pressure compensated priority flow control valve arrangement including an adjust chamber to automatically vary the operating pressure of the valve in "soft start-up" fashion by selectively discharging pressurized fluid from the pilot chamber and/or the adjust chamber in modulated fashion when fluid pressure reaches the threshold operating pressure.

6 Claims, 9 Drawing Sheets

PILOT OPERATED PRESSURE VALVE

BACKGROUND OF THE INVENTION

1. Scope Of Invention

This invention relates generally to pressure control valves in hydraulic systems, and more particularly to a pilot operated pressure valve which eliminates pressure spikes and hydraulic shock in such systems.

2. Prior Art

Pressure relief valves are used to provide a quick opening for excessive hydraulic pressure in a hydraulic system into which the valve is installed. These valves are characterized by a structure by which hydraulic pressure in the system is regulated by relieving and venting some of the pressurized fluid back to a supply tank or reservoir.

All conventional relief valves such as a differential piston relief valve or a pilot operated relief valve have a significant shortcoming when installed into a hydraulic system. When the hydraulic system is actuated so as to energize a hydraulic actuator, cylinder or motor, pressure increases virtually instantaneously. As a result, there is a sharp hydraulic spike in the pressure level of the fluid system which results in excessively abrupt energizing of the hydraulic motor. Not only is this operational limitation abusive to the system, but it may also be operationally detrimental in that the equipment being operated will exhibit too sharp a start-up.

Other patented relief valves claiming a "soft start" feature are disclosed in U.S. Pat. No. 4,653,527 to Kosarzecki, in U.S. Pat. No. 5,050,636 invented by Sagawa and in U.S. Pat. No. 5,381,823 invented by DiBartolo. In each of these prior art valves, pressurized fluid flow into the valve acts to move an internal piston that further loads a spring which increases the maximum operating pressure setting of the valve.

A general technical problem with the above relief valves concerns the principal embodied in each that depends upon a very high pressure drop across a pilot orifice which varies somewhat proportional to inlet pressure. At high inlet pressure and at sudden pressure increases, the setting of the valve increases much faster than at a low pressure having a slower pressure increase. In order to realize technically reasonable flows, Kosarzecki and DiBartolo both reduce the effective throttle diameter by using a wire or pin in a hole thus creating a very small ring area. However, the flow across such arrangements is viscosity sensitive.

The friction of the moveable piston in each of these devices is a source of yet another problem in loading the pilot spring to increase the operating pressure. The moveable piston must seal high pressure against the low pressure both existing simultaneously within these prior art valves. DiBartolo uses two seals that see the full pressure drop across the valve. The resulting friction drastically affects the performance of the valve. Thus, DiBartolo had to increase the effective area of the piston that loads the pilot spring. By this arrangement, the piston begins increasing the operating pressure setting of the valve at pressures much lower than the actual inlet pressure of the system. As a result, the valve is often prematurely set at a maximum setting thus having lost its damping or "soft start" feature altogether.

Kosarzecki reduced the friction of that valve by using a spool type piston without rubber seals. Although this device reduces the friction to a high degree, Kosarzecki still recommends an effective area for the spring-loaded piston that is ten percent (10%) greater than the effective area for the main piston. As a result, the setting of the valve is ten percent higher than the actual pressure if the inlet pressure remains steady for a period of time. Moreover, at sudden pressure increases, the Kosarzecki valve is closed first and pressure peaks cannot be eliminated. Further, this valve works only for a flow path which is "side-to-nose" which means that the operating pressure at the side of the valve is relieved to the nose thereof. The preferred flow path for cartridge valve is "nose-to-side" for many practical reasons.

The Sagawa patent reduces the friction at the loading piston by also using a spool-type piston without rubber seals. However, Sagawa also uses a differential area for this system so that the two diameters of the piston and the spool require very accurate manufacturing and concentricity.

These prior art soft start valves are direct acting relief valves. In contrast, the present invention is a pilot operated relief valve. As in other pilot operated relief valves, the pressure in the pilot chamber is much lower than the controlled pressure, but the loading mechanism always sees much higher pressure. Since the mechanism that changes the setting of the valve in the present invention is on the pilot side of the valve, this mechanism sees much lower pressures than the existing valves. That makes it possible to change the setting of the valve slowly and with low hysteresis.

The general principal incorporated in U.S. Pat. No. 6,119,722 and U.S. Pat. No. 6,039,070 involves limiting the pilot chamber pressure and rate of inlet pressure rise. This is accomplished in large part by positioning the variable spring loader mechanism in the very low pressure in the pilot chamber just sufficient to fully bias the pilot chamber spring to its maximum pressure setting. Moreover, the operating pressure at which the present invention opens slowly follows the actual pressure at the inlet port of the valve. At sudden pressure increase in the system when the inlet pressure exceeds the maximum valve setting, the valve opens until the setting and the actual pressure are equal again. Thus, assuming the flow does not exceed the capacity of the valve, the pressure at the valve inlet cannot rise faster than the operating pressure setting of the valve itself.

The present invention provides an improvement to the above-referenced '722 and '070 patent mechanisms by teaching a pressure compensated priority flow control valve which more accurately and smoothly controls the movement of the pilot sleeve and modulates that movement between a threshold operating pressure and a maximum operating pressure of the valve. By providing careful controlled flow of pressurized fluid into and from the adjust chamber of the present invention from the pilot chamber, the speed of the moving pilot sleeve is more accurately controlled as it modulates the variation in operating pressure of the valve against the pilot chamber springs and pilot ball, including increasing the threshold and the maximum operating pressure values.

BRIEF SUMMARY OF THE INVENTION

This invention is directed to a pilot operated pressure valve which limits the rate of start-up pressure rise ("soft start-up") and substantially eliminates excessive system pressure spikes. The valve includes an inlet, a hollow cylindrical main body sealingly connected at one end thereof to the inlet, a pilot chamber having a sleeve slidably mounted within the main body and an operating pressure adjustment connected to another end of the main body adjacent another end of the pilot chamber for varying the threshold operating pressure of the valve. A main chamber receives pressurized fluid metered through a main orifice and discharges pressurized fluid through a damping orifice when the main chamber is filled and fluid inlet pressure exceeds the inlet threshold pressure which is just sufficient to open a spring biased pilot ball downstream of the damping orifice. An exit port upstream of the main orifice will open for discharging pressurized fluid from the valve back to a supply tank when inlet pressure exceeds the maximum operating pressure setting of the valve. Pressurized fluid is also metered from the pilot chamber into a pressure compensated priority flow control valve arrangement including an adjust chamber to automatically vary the operating pressure of the valve in "soft start-up" fashion by selectively discharging pressurized fluid from the pilot chamber and/or the adjust chamber in modulated fashion when fluid pressure reaches the threshold operating pressure.

It is therefore an object of this invention to provide a pilot operated pressure valve which genuinely exhibits a limitation of pressure spikes and a rate of pressure rise of the fluid pressure in a hydraulic system.

It is still another object of this invention to provide a pressure valve for a hydraulic system which limits the pressure within the system so as not to exceed the maximum pressure setting of the valve.

It is yet another object of this invention to provide a pressure valve which limits the rate of pressure rise in a hydraulic system up to and not exceeding the maximum pressure setting of the valve.

It is yet another object of this invention to provide a pressure valve which exhibits the above features in various embodiments such as that of a pressure relief valve, a vented relief valve, a sequence valve, and a kick-down relief valve.

Yet another object of this invention is to provide a "soft start" and "soft relief" valve having an adjust chamber which carefully modulates the return flow of pressurized fluid from the valve between the variable threshold and maximum operating pressure of the valve.

In accordance with these and other objects which will become apparent hereinafter, the instant invention will now be described with reference to the accompanying drawings.

DETAILED DESCRIPTION OF THE INVENTION

Figure 1:
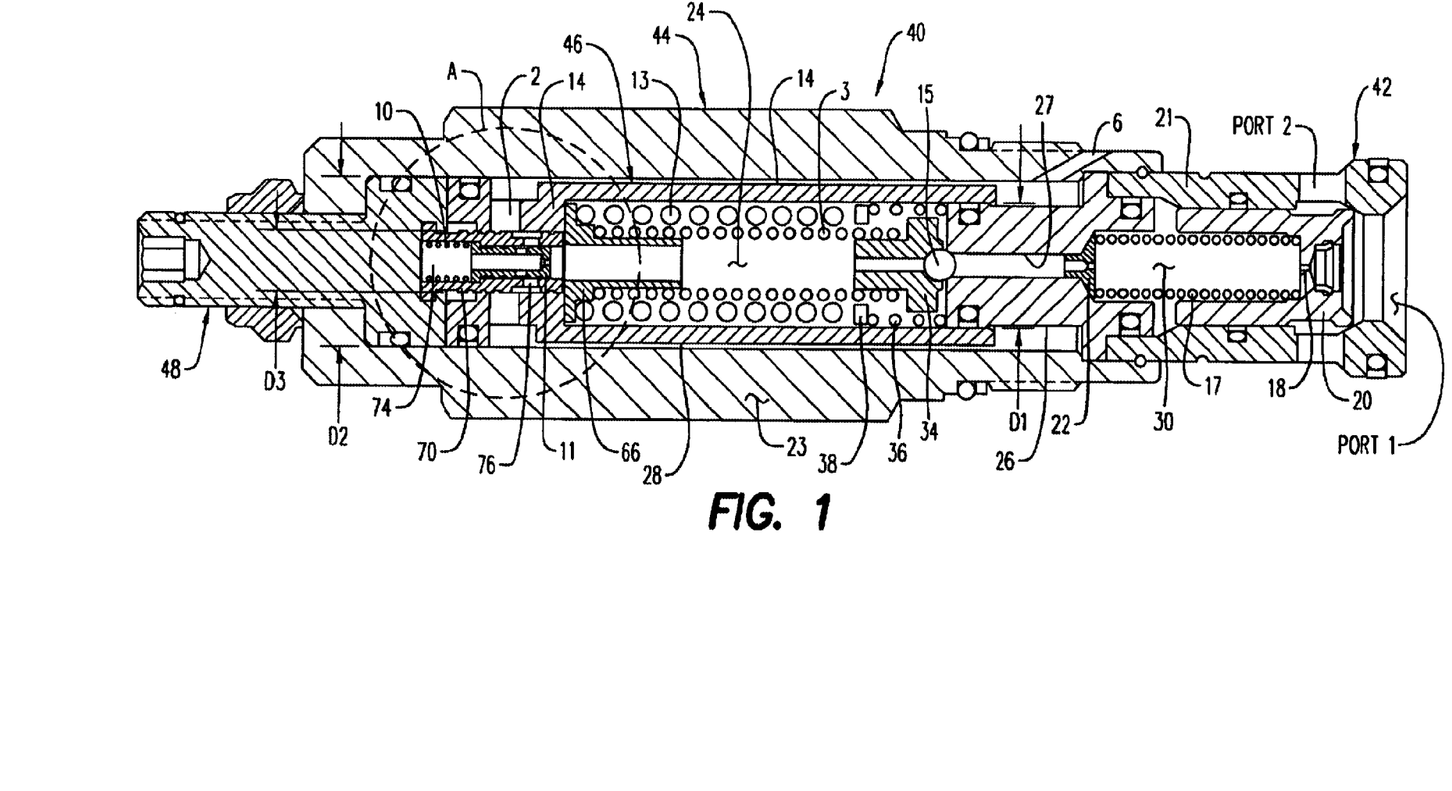
FIG. 1 is a side elevation section view of one embodiment of the invention.

Referring now to the drawings and firstly to FIG. 1 one embodiment is shown generally at numeral 40. This pilot operated pressure valve 40 generally includes four major components, an inlet member 42, an elongated cylindrical main body 44, a pilot chamber member 46 and a pressure adjustment member 48.

The main body 44 is sealably connected at one end thereof to, and longitudinally extending from, one end of the inlet member 42. The pilot chamber 46 includes a cylindrical sleeve 14 which is slidably mounted for limited longitudinal movement within the main body 44 and forms the side walls of a pilot chamber 24. Sleeve 14 is connected and longitudinally extends from a retainer 26 immovably held as part of the inlet member 42. The pressure adjustment member 48 is sealably and threadably connected to another end of the main body 44 at another end of the pilot chamber member 46 as shown in FIG. 1.

In general, the inlet member 42 is structured to receive pressurized fluid at system pressure. A main chamber 30 receives metered fluid flow at inlet port 1 through a main orifice 18 and transfers fluid at a pilot flow rate from the main chamber 30 through a damping orifice 22 into the pilot chamber 24 through retainer 26 when the inlet operating pressure of the valve is sufficient to unseat a biased closed pilot ball 15. The main chamber 30, including a compression spring 17, maintains the head of main piston 20 in a closed configuration shown in FIG. 1 wherein the outlet port 2 is sealed from fluid communication with the inlet port 1. When the inlet pressure rises above the preset operating pressure of the valve, fluid flow through the main orifice 18 creates sufficient pressure drop across the main orifice 18 to overcome main spring 17, whereupon pressurized hydraulic fluid will flow directly from inlet port 1 to outlet port 2 and then to a tank or reservoir at lower or zero pressure.

Pressurized fluid at inlet port 1 flows at a low pilot flow rate through the main orifice 18 positioned centrally at one end of the main piston 20. The preferred size of main orifice 18 is about 0.03" in diameter. When the main chamber 30 is filled with hydraulic fluid, the pressure in chamber 30 will generally equal that of the system pressure at inlet port 1. The pressurized fluid also flows from the main chamber 30 through a damping orifice 22 positioned centrally within a longitudinal passage 27 of retainer 26 and, when the inlet fluid pressure increases to an operating pressure initially established by the preload of an inner pilot spring 3, the pilot ball 15 will be unseated against the biasing force produced by the inner pilot spring 3 within the pilot chamber 24. Thereafter, the entire pilot chamber 24 will be filled with pressurized fluid. A clearance gap 28 is provided between the outer cylindrical surface of sleeve 14 and the inner cylindrical surface of the main body 23 which directs fluid through a relief hole 6 formed through the main body 23 adjacent one end thereof.

The flow rate required to load the pilot chamber 24 to keep the valve set at the actual pressure at port 1 is lower than the flow required to move the main piston 20 against the main spring 17. Pressurized fluid at the relatively low pilot chamber pressure additionally flows from the pilot chamber 24 through a orifice 11 to fill an adjust chamber 74 and its outer loading chamber 32 against surface 14a in FIG. 1 equal to the surface area of diameter D2 of pilot sleeve 23 reduced by the area of diameter D3. Because the loading chamber surface is larger in area than that of D1, the surface area of retainer 26, as pilot chamber fluid pressure increases, the compression force exerted against the inner pilot spring 3 is increased by pilot sleeve 14 moving toward retainer 26 to increase the sealing pressure against the pilot ball 15. By this arrangement of sufficiently large differential area, the operating pressure required within the main chamber 30 to unseat the pilot ball 15 increases with pilot chamber pressure to adjust the threshold operating pressure of the valve 40. Thus, the minimum pilot spring force exerted to maintain the pilot ball 15 in a seated orientation is established at no or very low pilot chamber pressure.

Figure 2A:
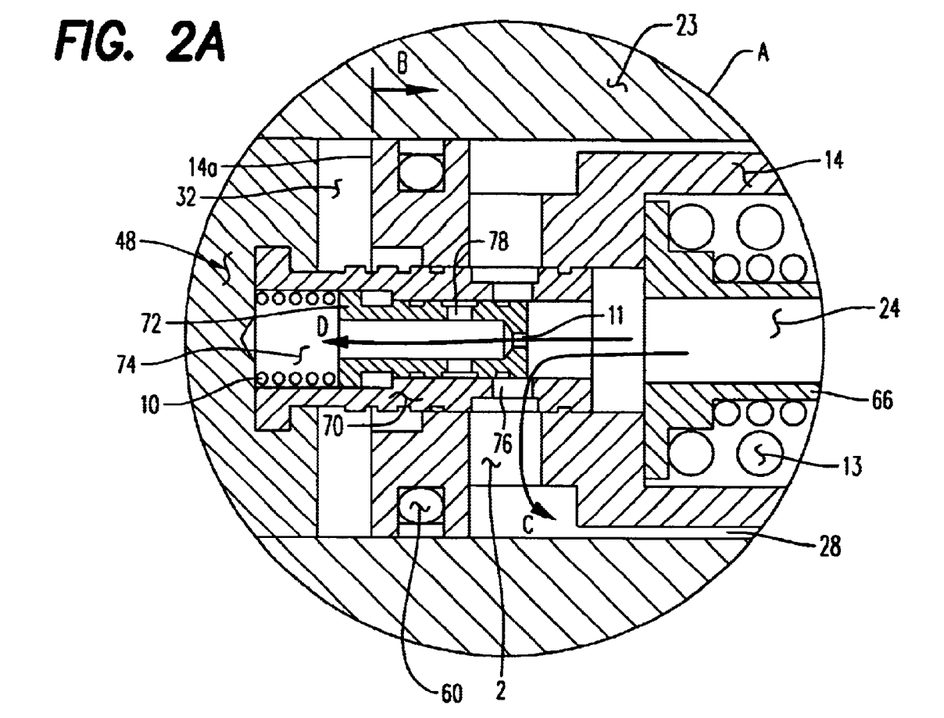
FIGS. 2A, 3A, 4A and 5A are enlargements of area A of FIG. 1 shown at increasing fluid pressure operating settings within the valve.

Once the pilot chamber 24 is filled with pressurized fluid in the direction of arrow D after the initial threshold pressure has been introduced into the main chamber 30 sufficient to overcome the initial spring pressure against the pilot ball 15, the pressurized fluid then flows through the orifice 11 formed in the head of a pilot piston 72. As best seen in FIGS. 2A to 5A, the pilot piston 72 is slidably engaged within a pilot piston sleeve 70 which is secured at one end thereof to one end of the pressure adjustment member 48 as shown. As seen in FIG. 2A, the pressurized fluid within the adjust chamber 74 reaches the loading chamber 32 and acts against loading surface 14A to move the piston sleeve 14 in the direction of arrow B thus increasing the spring tension on the inner spring 3 against the pilot ball 15 to, in turn, increase the threshold pressure required to unseat the pilot ball 15.

Pressurized fluid begins to then flow in the direction of arrow C in FIG. 2A between the head of the pilot piston 72 and the pilot piston sleeve port 76 formed through the side wall of the pilot piston sleeve 70. This fluid flow in the direction of arrow C enters the clearance gap 28 and is discharged through the relief hole 6 formed diagonally through the main body 23 for recirculation back into a fluid tank or reservoir.

Figure 2B:
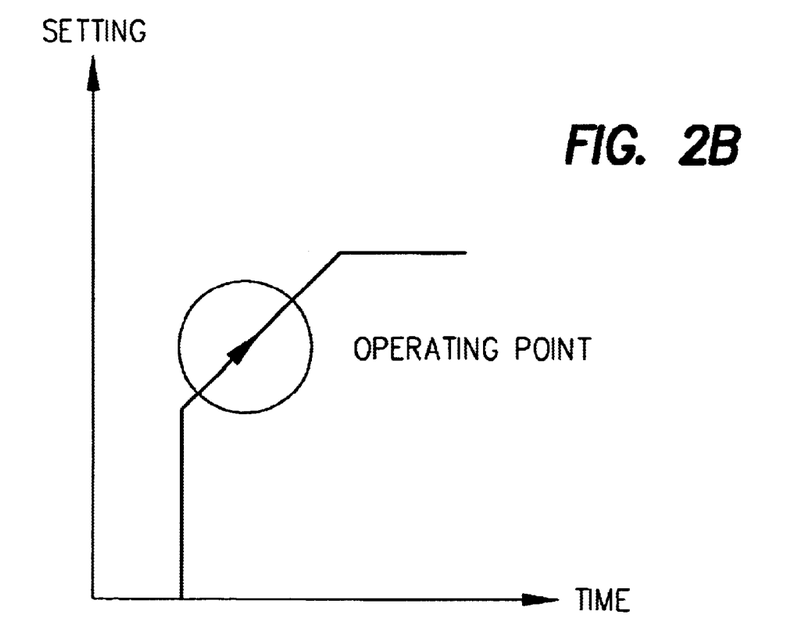
FIGS. 2B, 3B, 4B and 5B are simplified graphs showing the changing or "ramping" of the pressure setting increases vs. time of the valve of FIG. 1 at the positions of the valve corresponding to FIGS. 2A, 3A, 4A and 5A, respectively.

The initial threshold pressure for unseating the pilot ball 15 is set, in part, by the selection of the strength of inner pilot spring 3 and the pressure adjusting member 48 by its threadable adjustment longitudinally with respect to one end of the main body 23 as shown. Once the pilot chamber 24 and the adjust chamber 74 are filled, the threshold setting of the valve 40 begins to increase as shown in FIG. 2B. When the inlet pressure reaches the initial threshold pressure level, the portion of the valve 40 shown in FIGS. 2A to 5A begins to act as a priority flow control valve, the threshold pressure setting of the valve thereafter increasing on a ramp as seen in FIG. 2B, the operating pressure point of the valve there shown. By the controlled excess flow of fluid in the direction of arrow C in FIG. 2A, the speed of movement of the pilot sleeve 14 is thus regulated as it continues to compress the inner pilot spring 3, and then the outer pilot spring 13 as described herebelow.

Figure 3A:
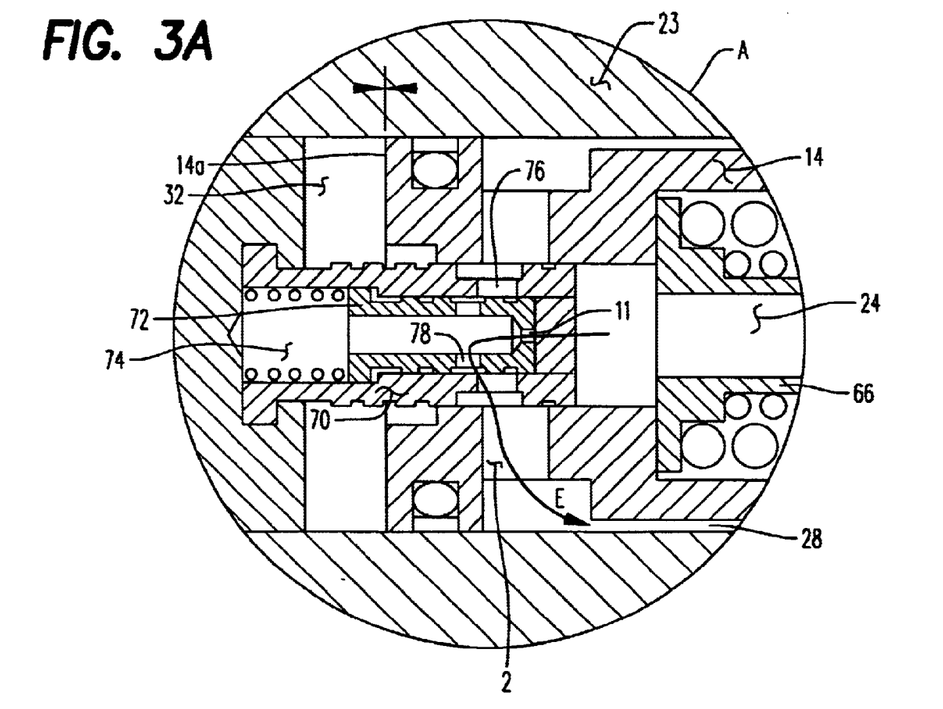
Figure 3B:
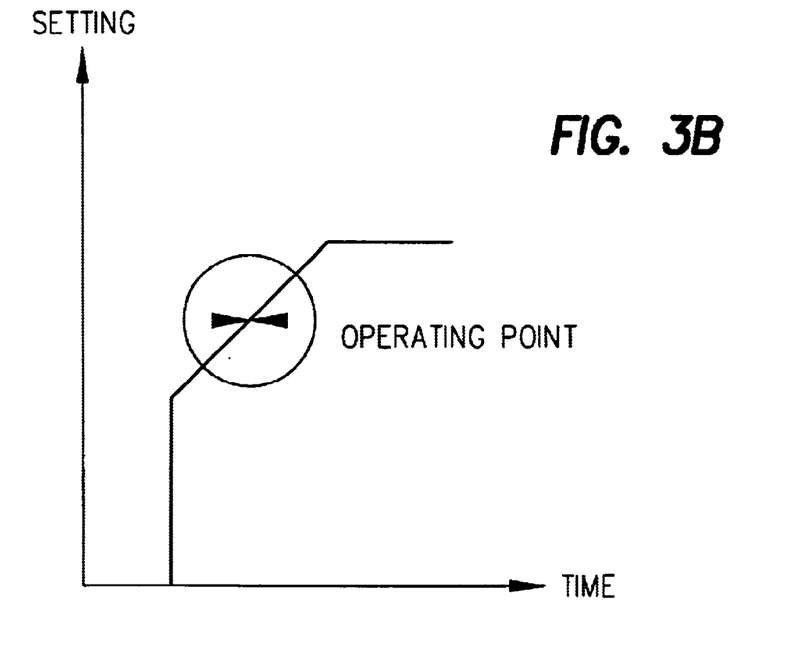

The positioning of the pilot piston 72 in normal use is in the general location shown in FIG. 3A when the inlet pressure fluctuates between the threshold pressure and the maximum operating pressure. As seen in FIG. 3B, the normal operating point of the valve is where variations in inlet pressure result in ramped, controlled movement of the pilot piston 72 and the pilot sleeve 14. It is at this position that fluid begins to flow from the adjust chamber 74 through a pilot piston port 78 which has now become at least partially aligned with the pilot piston sleeve port 76 so that pressurized fluid from the adjust chamber 74 flows in the direction of arrow E into the clearance gap 28 for discharge from the relief hole 6.

Figure 4A:
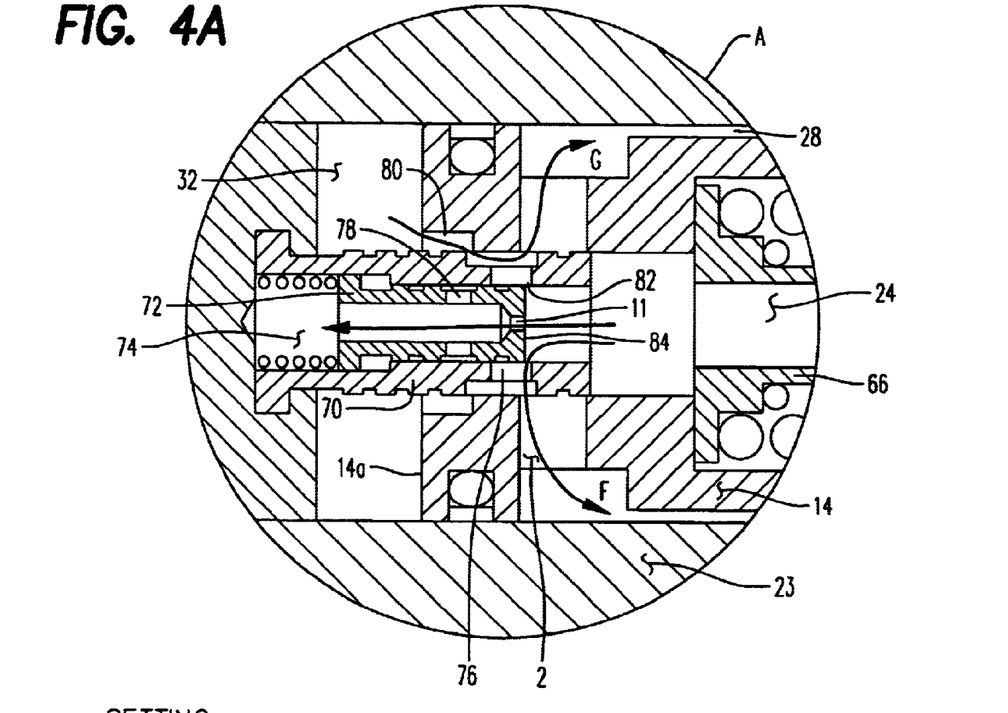
Figure 4B:
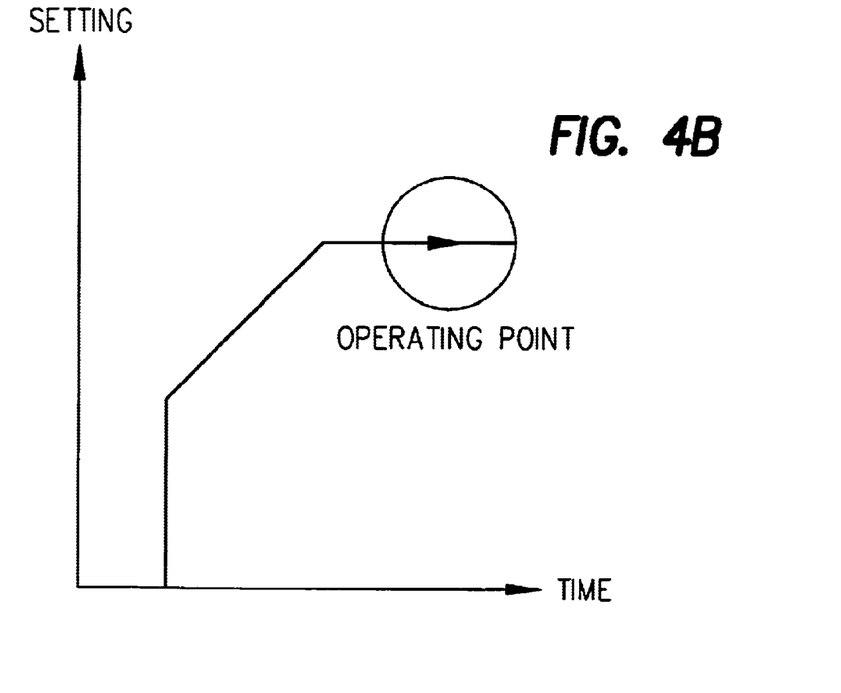

Referring now to FIGS. 4A and 4B, at some point the maximum pressure setting may be reached so that pressure within the adjust chamber 74 cannot rise further. At this point, the pilot piston 72 has moved to a position, in conjunction with the further compressive movement of the pilot sleeve 14, to fully compress the inner and outer pilot springs 3 and 13 to a point where pressurized fluid flows from the loading chamber 32 and the adjust chamber 74 in the direction of arrow G from the bypass/return hole 2 for discharge through clearance gap 28. Pressurized fluid flow from the pilot chamber 24 also occurs in the direction of arrow F into the clearance 82 between the head of the pilot piston 72 and the pilot piston sleeve port 76. The operating point of the valve is shown in FIG. 4B to be the maximum pressure setting of the valve 40. Again, since the pilot piston sleeve 72 is connected to the pressure adjust member 48 as shown, the maximum setting of the valve 40 can be set by varying the amount of threadable engagement between the pressure adjustment member and the main body 23 as previously described.

Figure 5A:
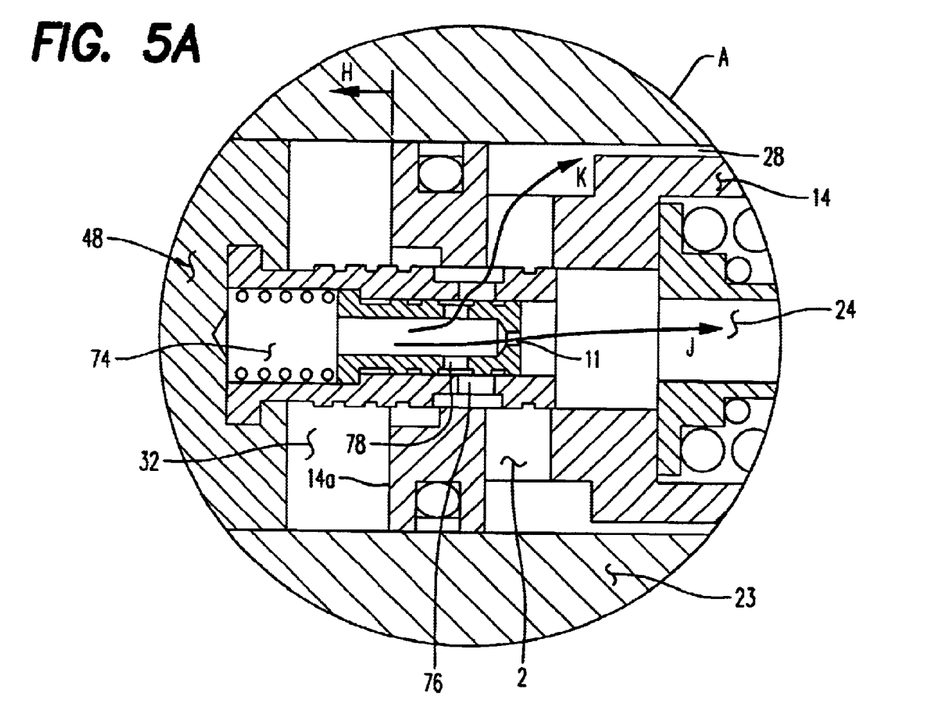
Figure 5B:
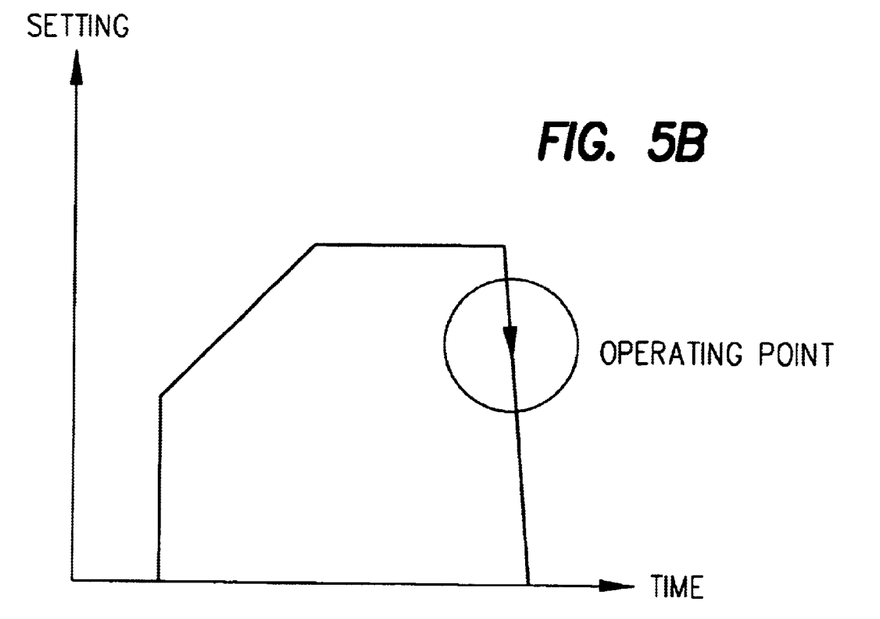

Referring now to FIGS. 5A and 5B, the performance of the valve 40 after it has reached the maximum pressure setting and the inlet pressure drops is there shown. Pressurized fluid from the adjust chamber 74 and the loading chamber 32 exits therefrom in the direction of arrow J through the relief orifice 11 back into the pilot chamber 24 and through the pilot piston sleeve port 76 in the direction of arrow J into the bypass/return hole 2 for discharge through the clearance gap 28.

The fluid control spring 10 moves the pilot piston 72 in the direction of arrow H to establish the flow path K as above described. This fluid flow path K sees a very low resistance only and therefore, the valve 40 can quickly reset as shown in FIG. 5B.

Because the hydraulic resistance for resetting this valve 40 is low, soft pilot springs 3 and 13 may be used. These low strength pilot springs 3 and 13 allow for the low initial settings of the valve as previously described. When the pilot sleeve 14 begins movement to increase the threshold valve setting, only the lower spring rate of the inner pilot spring 3 affects the threshold setting of the valve 40. After a certain displacement of the pilot sleeve 14, the stronger outer pilot spring 13 comes in contact with the ball holder 34. From this point onward with increased fluid pressure, the applied force to maintain the pilot ball 15 in its seated position increases more rapidly. A return spring 36 also pushes a washer 38 against the outer pilot spring 13 so that the outer spring 13 is maintained in position, as well as assisting in moving the pilot sleeve 14 back without affecting the threshold setting of the valve 40.

Figure 6:
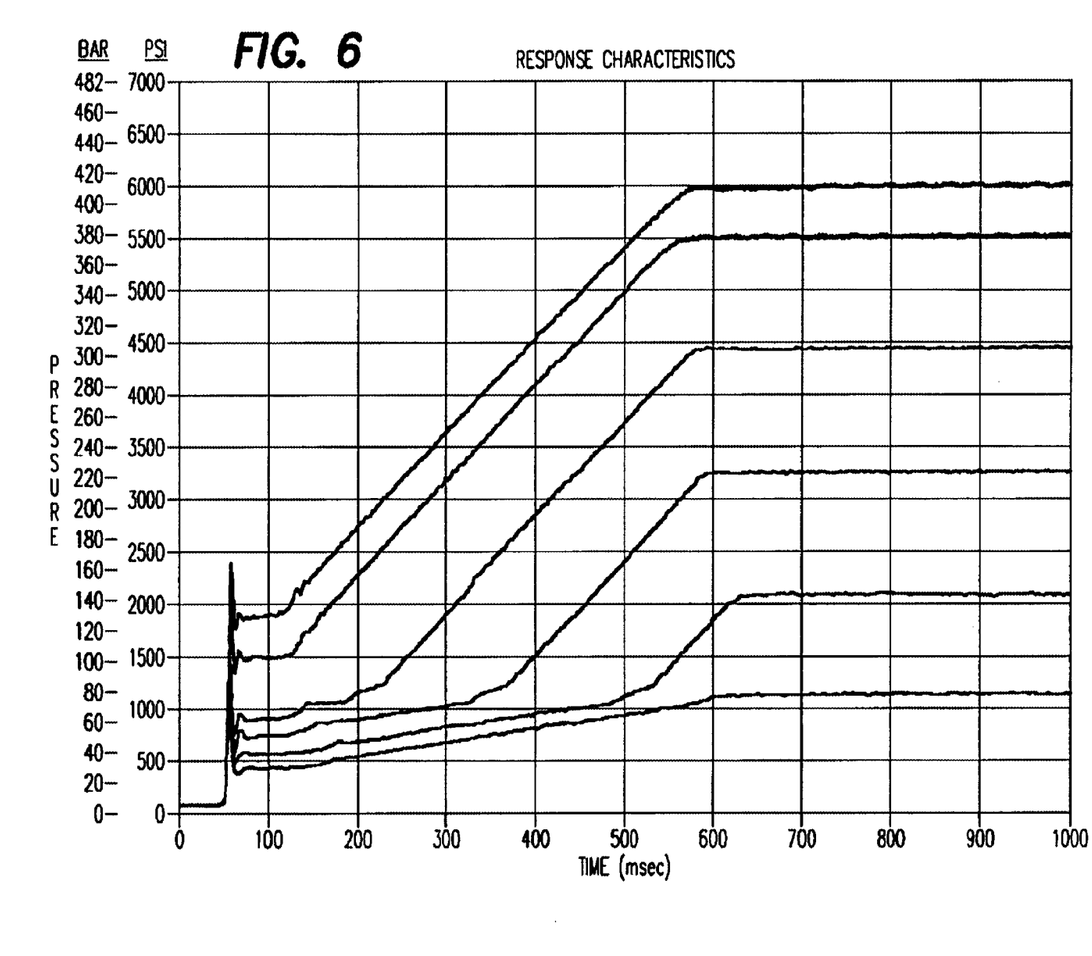
FIG. 6 is a recorded fluid pressure vs. time plot similar to that of FIG. 6 showing a family of pressure versus time response curves for the multi-stage pilot spring arrangement.

Referring now to FIG. 6, actual test results with valve 40 at various initial threshold pressure settings as above described are there shown. Initially, the threshold pressure increases slowly while only the inner spring 3 of lighter strength is in contact with the ball holder 34. Thereafter, the ramp becomes steeper when the stronger outer pilot spring 13 also begins to apply a larger force against the ball holder 34. One distinct advantage of this arrangement is that it can be used to change the maximum pressure setting of the valve without substantially changing the threshold setting significantly. This dual ramped pressure use feature is preferred, but may be replaced with a single pilot spring as well.

Figure 7:
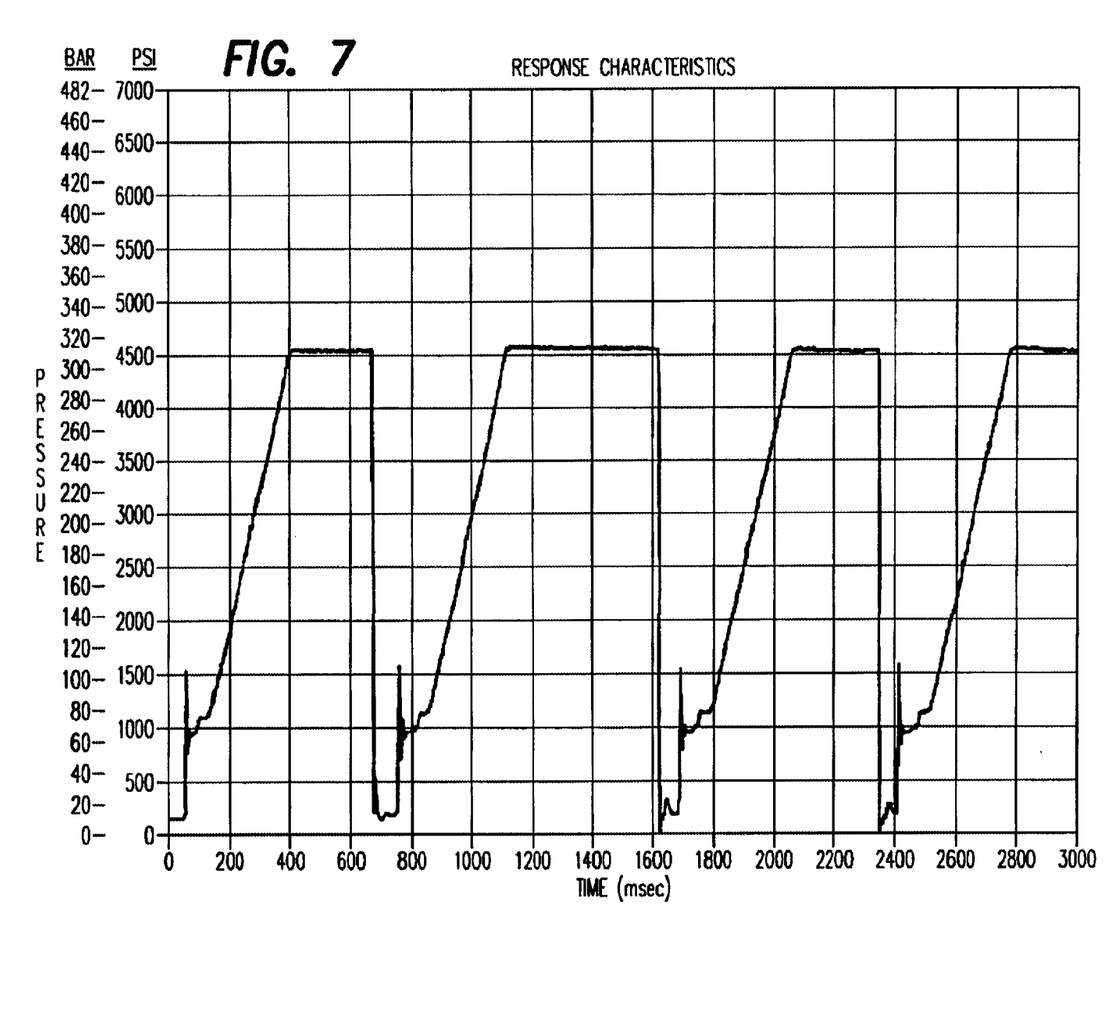
FIG. 7 is a typical recorded fluid pressure rise and fall versus time plot of fluid pressure at the inlet of the invention of FIG. 1 showing the reset performance.

In FIG. 7, the repeated reset performance of valve 40 is there shown. The total time scale of FIG. 7 is three seconds. The reset time between the last two cycles or steps is only about 50 m sec. The valve 40 fully resets itself within this time period. Therefore, it is capable of responding to pressure peaks in a hydraulic system that occur within this short a time frame which is quite remarkable. Prior art valves typically reset in 100–400 m sec.

In summary, the present invention limits the rate of pressure rise within an adjustable operating pressure range and further limits the maximum pressure within the valve and the system in which it is connected. Because of this pressure rate increase limitation, pressure spikes or hydraulic shock are also eliminated by the valve. The valve operating pressure at which the valve will open slowly follows the actual pressure at the inlet port 1. At sudden pressure increase above operating pressure, the valve opens to allow pressurized fluid to discharge through port 2 until such time as the operating pressure of the valve and the actual inlet pressure are again equal. Moreover, unless the fluid flow into the valve exceeds the capacity of the valve itself, the pressure cannot rise faster than the operating pressure setting of the valve.

As other pilot operated relief valves, this valve has a low pressure in the pilot chamber. For the soft start mechanism, this is important in three respects:

a. The maximum pressure drop across the orifice; 11 is only 225 p.s.i. That means a low consistent flow into the loading chamber 32 which distinguishes this "soft start" valve from other soft start valves. Other valves typically have up to 6000 p.s.i. pressure differential across the orifice that controls the shift of the piston or pilot sleeve that determines the valve setting. This rate of flow into the loading chamber through orifice 11 determines the rate at which the setting of the valve changes. The rate of setting change equals the rate of pressure rise at port 1;

b. The seals 60 and 62 near each end of the sleeve member 46 see a pressure drop of only 225 p.s.i. maximum as compared to up to 6000 p.s.i. in other designs, a factor of about 27. This translates into significantly lower friction and lower hysteresis of the present invention over other such prior art valves.

c. The pilot pressure also determines the fluid losses while the valve is active. Assuming that the pressure at port 1 is within the range where the valve limits the rate of pressure rise, the valve then adjusts it's setting to the actual pressure at port 1. It does so by pressurizing the pilot chamber. A pressurized pilot chamber causes a pilot flow out through orifice 3. The lower the pressure in the pilot chamber, the lower the fluid losses.

ALTERNATE EMBODIMENT

The basic structure of the present invention as above described may be easily modified within the intended scope of this invention. One such alternate embodiment is in the form of a vented relief valve achieved by adding another exit port in the main body 23 which is in fluid communication with another crosshole positioned between the damping orifice 22 and the pilot ball 15. This produces a very low crack or opening pressure of the piston 20 to exit port 2, depending upon the preload of the main spring 17. Since this valve would be vented downstream of the damping orifice 22, a second pilot relief valve at exit port 2 is remotely controlled. By selectively closing this third port, the setting of the valve rises quickly to the minimum pressure setting as above described. If the pressure at the inlet port 1 rises further, the valve limits the rate of pressure rise again as previously described.

Another embodiment of this invention is in the form of a sequence valve which would include a third port through the main body 23 rather than through port 2 via the relief ball 11 and crosshole 2 of FIGS. 1 and 2. Such a sequence valve could be used to control the movement of hydraulic actuators wherein, if the pressure at inlet port 1 rises because a first actuator is fully extended, the valve would open and another actuator connected to port 2 would begin to move. Conventional sequence valves open abruptly causing shocks as previously described when the first actuator comes to a mechanical stop, the adaptation of the present invention rather insuring a smooth transition.

Still another alternate embodiment of the present invention is in the form of a kick-down relief valve which would incorporate a crosshole extending from the main chamber 30 to the seating surface of the piston 20. This embodiment would also eliminate the main orifice 18 so that this valve would open and stay open if the pressure rise at the inlet port exceeds the maximum rate of pressure rise of the valve. The valve would remain open once it is opened because the proposed crosshole in the piston sees the pressure much lower than the pressure at port 1 because of the high rate of fluid flow across the end of the crosshole as fluid moves between port 1 and port 2.

Because all of these alternate embodiments incorporate the relief valve arrangement at the opposite end of the pilot chamber as shown and described in FIG. 2, they also possess this actually realized "soft start" feature with no excessive start-up pressure spikes above the operating pressure of the valve.

Referring now to FIGS. 8 to 11, an alternate and preferred embodiment of the pressure compensated priority flow control valve portion is there shown in circle A' corresponding to the area A shown in FIGS. 2A to 5A. In this embodiment, the pilot piston 80 is slidably engaged directly within a longitudinal cylindrical bore formed into one end of the pilot sleeve 14' as shown. The head of the pilot piston 80 includes an orifice 86 which is in fluid communication with the pilot chamber shown extended at 24' through the spring seat 66'. Again, the lighter inner pilot spring 3 and the stronger outer pilot spring 13 are preferred as previously described.

The pilot piston 80 further includes a pilot piston port 88 formed through the side wall thereof in fluid communication with the adjust chamber 98. The flow control spring 102 acts between the mating cavity formed into the pressure adjust member 48' and an internal shoulder formed within the pilot piston 80 as shown. Flanges 80*a* slidably engage within relief 96 and travel toward shoulder 100 as the threshold pressure is increased as below described.

Figure 8:
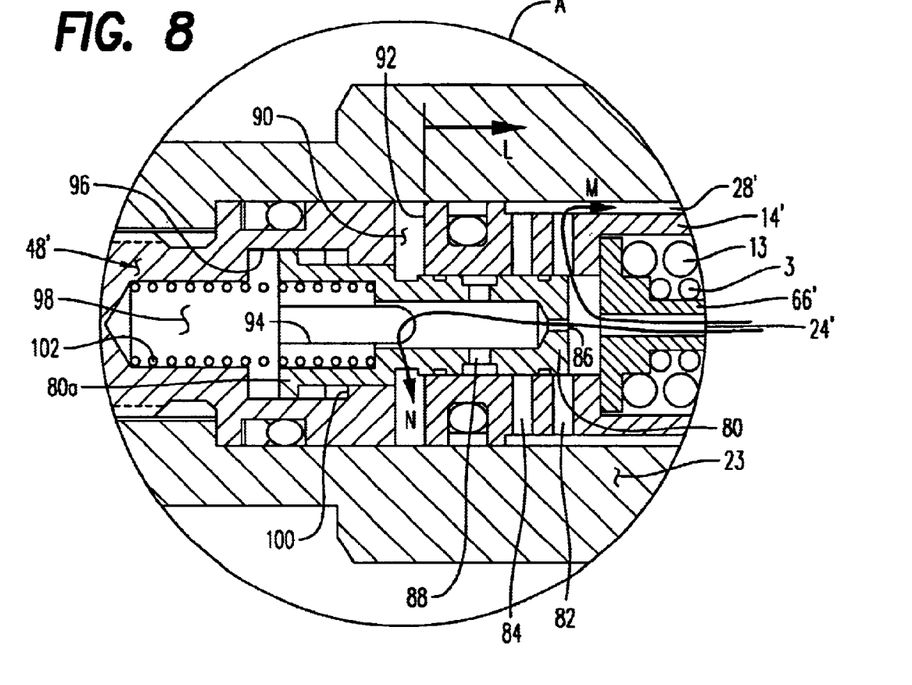
FIGS. 8 to 11 are similar to FIGS. 2A to 5A except depicting a preferred embodiment of the flow control area of the invention.

As pressurized fluid is introduced into the adjust chamber 98 through orifice 86 from the pilot chamber 24', the previously described area differential upon which the pressurized fluid acts within loading chamber 90 against loading surface 92 causes the pilot sleeve 14' to move in the direction of arrow L in FIG. 8 so as to increase the spring tension on the inner spring 3 and therefore to increase the threshold pressure at which the pilot ball 15 would be unseated. Pressurized fluid then flows into the adjust chamber 98 and its loading chamber 92 via a slot 94 in the direction of arrow N to cause movement L. A small clearance between the head of the pilot piston 80 and the bypass port 82 formed transversely through the end of the pilot sleeve 14' allows pressurized fluid to also flow in the direction of arrow M directly from the pilot chamber 24' for discharge through clearance gap 28' and then through the relief hole 6 as previously described. The performance point of the valve as shown in FIG. 8 is identical to that described in FIG. 2B hereinabove.

Figure 9:
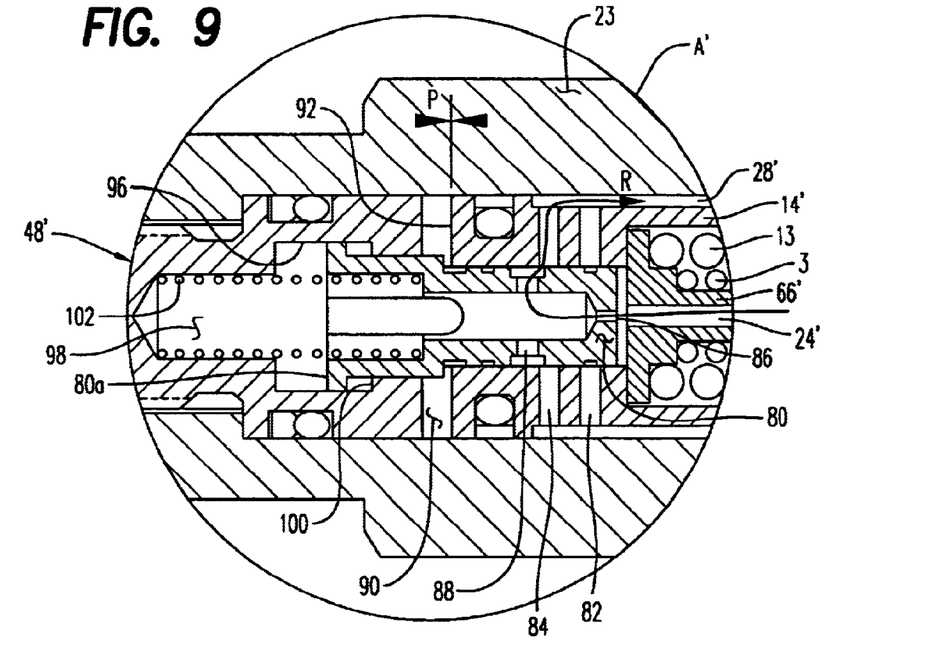

In FIG. 9, the valve operating pressure as previously shown in FIG. 3B has reached a normal operating point of the valve wherein the movement of the pilot sleeve 14' is in smooth small increments in the direction of arrow P. The pilot piston 80 has also moved slightly as urged by the flow control spring 102 so that pressurized fluid enters the adjust chamber 98 through the orifice 86 and then discharges therefrom in the direction of flow path R. This flow path R is affected through the at least partial alignment of the pilot piston port 88 and a return hole 84.

Figure 10:
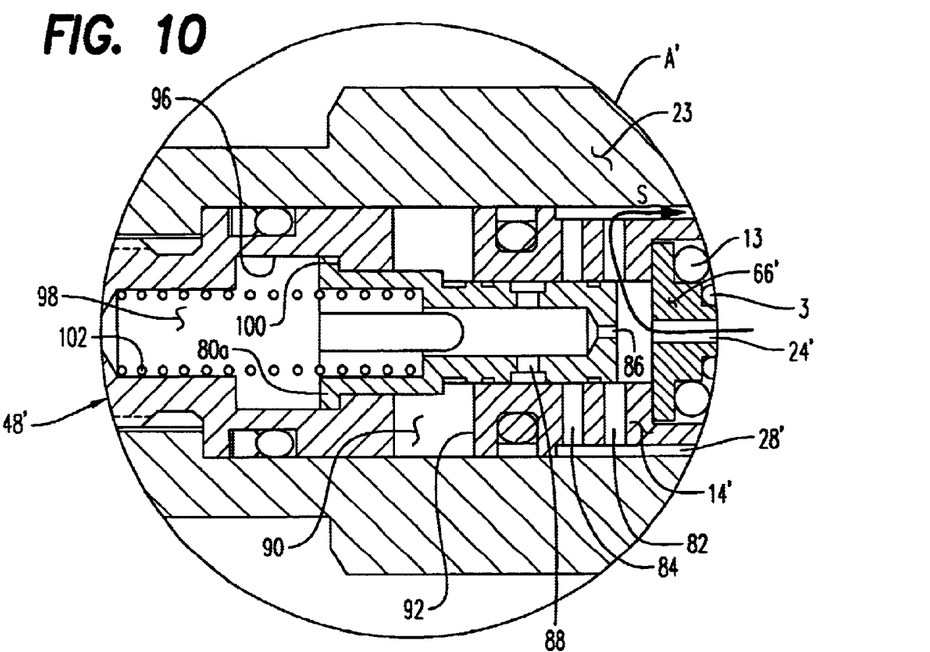

At the maximum operating pressure of the valve as seen in FIG. 4B and FIG. 10, the stop 80a of the pilot piston 80 comes in contact with shoulder 100. The flow path of pressurized fluid has again been altered so that the flow path of arrow S from the pilot chamber 24' directly through the bypass port 82 and into the clearance gap 28'.

Figure 11:
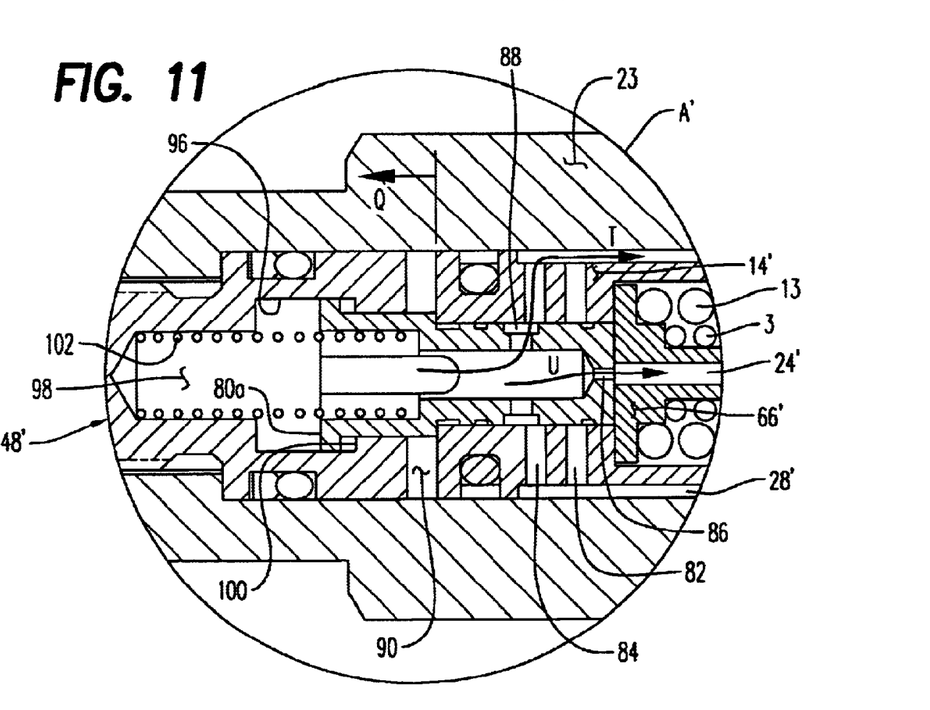

When pilot fluid flow stops as when the pressure at the inlet port drops, the flow control spring 102 pushes the pilot piston 80 to establish the flow path T in FIG. 11. This flow path T is from the adjust chamber 98 exiting through the pilot piston port 88, then through the return hole 84 for discharge through the clearance gap 28'. A portion of the pressurized oil within the adjust chamber 98 also passes back into the pilot chamber 24' in the direction of flow path U through the orifice 86. The operation of the valve as shown in FIG. 5B and the rapid reset characteristics previously described in FIG. 7 are also exhibited in this embodiment.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A pilot operated pressure valve comprising:
   an elongated inlet member, an elongated cylindrical hollow main body sealingly connected at one end thereof to and longitudinally extending from said inlet member, an elongated pilot chamber member having a pilot chamber and being mounted within a cylindrical interior of said main body and longitudinally extending at one end thereof from said inlet member, and a pressure adjusting member adjustably sealingly connected to another end of said main body at another end of said pilot chamber member and defining an adjust chamber therebetween;
   said inlet member including an inlet port at one end thereof, an outlet port, a retainer sealingly connected to another end of said inlet member, a main piston slidably mounted within said inlet member, and a main spring positioned within and extending longitudinally along a main chamber formed centrally between said retainer and said main piston;
   a head of said main piston defining one end of said main chamber and including a main orifice adjacent said inlet port which allows a relatively small quantity of pressurized fluid at said inlet port to be metered into and fill said main chamber;
   said retainer including a longitudinally extending damping orifice in fluid communication with said main chamber which allows a relatively small quantity of pressurized fluid in said main chamber to be metered into said pilot chamber from said main chamber;
   said main spring biasingly urging said main piston into sealing engagement against said inlet port until a predetermined inlet pressure is reached equal to a maximum operating pressure of said valve whereupon said main piston is opened by axial movement thereof against said main spring to allow pressurized fluid to enter said inlet port and to exit said valve directly from said outlet port;
   said pilot chamber member including an elongated pilot spring acting at one end thereof within an elongated pilot sleeve of said pilot chamber member against a pilot ball to seal said pilot chamber up to a minimum operating pressure equal to a threshold fluid pressure within said main chamber;
   said pilot sleeve longitudinally positionable by said pressure adjusting member within said main body to vary a length of said pilot spring and thus to vary the threshold pressure required to unseat said pilot ball;
   said pilot sleeve including a bypass or return hole at one end portion thereof which is closed to fluid communication with said pilot chamber by a pilot piston biasingly, longitudinally slidably positionable within said adjust chamber, one end of said pilot piston including a relief orifice which allows a relatively small quantity of pressurized fluid in said pilot chamber to be metered therefrom into fill said adjust chamber;
   said adjust chamber having a net surface area greater than that of said retainer whereby said pilot sleeve is moveably urged against said pilot spring to vary the valve operating pressure between the threshold pressure and a maximum valve operating pressure;
   said one end portion of said pilot sleeve and said pilot piston cooperatively structured to provide a gradual, controlled ramp up of fluid pressure within said valve above the threshold pressure by preselective pressurized fluid return from said pilot chamber and/or said adjust chamber whereby sharp fluid pressure spikes within said valve as fluid pressure rises from the threshold pressure to the maximum operating pressure are substantially avoided.

2. A pilot operated pressure valve as set forth in claim 1, wherein said pilot spring includes:
   an inner pilot spring which is pretensioned against said pilot ball, said inner spring increasing the threshold pressure as soon as said pilot chamber and said adjust chamber are filled with pressurized fluid;
   an outer pilot spring which is unloaded and untensioned against said pilot ball until fluid pressure in said pilot chamber substantially exceeds the threshold pressure whereupon said inner and outer pilot springs begin to act in parallel unison to maintain said pilot ball seated.

3. A pilot operated pressure valve comprising:
   an elongated inlet member, an elongated cylindrical hollow main body sealingly connected at one end thereof to and longitudinally extending from said inlet member, an elongated pilot chamber member having a pilot chamber and being mounted within a cylindrical interior of said main body and longitudinally extending at one end thereof from said inlet member, and a pressure adjusting member adjustably sealingly connected to another end of said main body at another end of said pilot chamber member and defining an adjust chamber therebetween;
   said inlet member including an inlet port at one end thereof, an outlet port, a retainer sealingly connected to another end of said inlet member, a main piston slidably mounted within said inlet member, and a main spring positioned within and extending longitudinally along a main chamber formed centrally between said retainer and said main piston;
   a head of said main piston defining one end of said main chamber and including a main orifice adjacent said inlet port which allows a relatively small quantity of pressurized fluid at said inlet port to be metered into and fill said main chamber;
   said retainer including a longitudinally extending damping orifice in fluid communication with said main chamber which allows a relatively small quantity of pressurized fluid in said main chamber to be metered into said pilot chamber from said main chamber;

said main spring biasingly urging said main piston into sealing engagement against said inlet port until a predetermined inlet pressure is reached equal to a threshold pressure of said valve whereupon said main piston is opened by axial movement thereof against said main spring to allow pressurized fluid to enter said inlet port and to exit said valve directly from said outlet port;

said pilot chamber member including an elongated pilot spring acting at one end thereof within an elongated pilot sleeve of said pilot chamber member against a pilot ball to seal said pilot chamber up to a first predetermined fluid pressure within said main chamber;

said pilot sleeve longitudinally positionable by said pressure adjusting member within said main body to vary a length of said pilot spring and thus to vary the threshold pressure required to unseat said pilot ball;

a pilot piston slidable and sealingly engaged within a cylindrical bore formed longitudinally in one end portion of said pilot sleeve, a flow control spring biasingly holding said pilot piston in a closed position when fluid pressure in said pilot chamber is below the threshold pressure;

said pilot sleeve including a bypass or return hole at said one end portion thereof closed to fluid communication with said pilot chamber when said pilot piston is in the closed position, a head of said pilot piston including a relief orifice which allows a relatively small quantity of pressurized fluid in said pilot chamber to be metered into said adjust chamber and back, depending upon the pressure gradient between said pilot chamber and said adjust chamber;

said adjust chamber having a net surface area greater than that of said retainer whereby said pilot sleeve is moveably urged against said pilot spring to selectively vary the valve operating pressure between the threshold and a maximum operating pressure of said valve;

said pilot piston cooperatively structured with respect to said cylindrical bore and said pressure adjusting member to:

a. further compress said flow control spring and to allow a small quantity of excess fluid flow beyond that required to fill said adjust chamber to exit only from said pilot chamber through said bypass or return hole when pressure in said pilot chamber just begins to exceed the threshold pressure;

b. still further compress said flow control spring and to allow fluid to exit only from said adjust chamber through said bypass or return hole when pressure in said pilot chamber substantially exceeds the threshold pressure;

c. allow fluid to exit from said adjust chamber and said pilot chamber through said bypass or return hole when pressure in said pilot chamber reaches the maximum operating pressure;

d. allow fluid to exit only from said adjust chamber through said bypass hole and back into said pilot chamber through said relief orifice when pressure in said pilot chamber drops from the maximum operating pressure.

4. A pilot operated pressure valve as set forth in claim 3, wherein said pilot spring includes:

an inner pilot spring which is pretensioned against said pilot ball, said inner spring increasing the threshold pressure as soon as said pilot chamber and said adjust chamber are filled with pressurized fluid;

an outer pilot spring which is unloaded and untensioned against said pilot ball until fluid pressure in said pilot chamber substantially exceeds the threshold pressure whereupon said inner and outer pilot springs begin to act in parallel unison to maintain said pilot ball seated.

5. A pilot operated pressure valve comprising:

an elongated inlet member, an elongated cylindrical hollow main body sealingly connected at one end thereof to and longitudinally extending from said inlet member, an elongated pilot chamber member having a pilot chamber and being mounted within a cylindrical interior of said main body and longitudinally extending at one end thereof from said inlet member, and a pressure adjusting member adjustably sealingly connected to another end of said main body at another end of said pilot chamber member;

said inlet member including an inlet port at one end thereof, an outlet port, a retainer sealingly connected to another end of said inlet member, a main piston slidably mounted within said inlet member, and a main spring positioned within and extending longitudinally along a main chamber formed centrally between said retainer and said main piston;

a head of said main piston defining one end of said main chamber and including a main orifice adjacent said inlet port which allows a relatively small quantity of pressurized fluid at said inlet port to be metered into and fill said main chamber;

said retainer including a longitudinally extending damping orifice in fluid communication with said main chamber which allows a relatively small quantity of pressurized fluid in said main chamber to be metered into said pilot chamber from said main chamber;

said main spring biasingly urging said main piston into sealing engagement against said inlet port until a predetermined inlet pressure is reached equal to a maximum operating pressure of said valve, whereupon said main piston is opened by axial movement thereof against said main spring to allow pressurized fluid to enter said inlet port and to exit said valve directly from said outlet port;

said pilot chamber member including an elongated pilot spring acting at one end thereof within an elongated pilot sleeve of said pilot chamber member against a pilot ball to seal said pilot chamber up to a minimum operating pressure of said valve equal to a threshold fluid pressure within said main chamber;

said pilot sleeve longitudinally positionable by said pressure adjusting member within said main body to vary a length of said pilot spring and thus to vary the threshold operating pressure which is required to unseat said pilot ball;

said pilot sleeve including a bypass or return adjacent one end thereof in fluid communication with a relief hole of said main body, said relief hole closed to fluid communication with said pilot chamber by a pilot piston longitudinally slidably positioned within an adjust chamber formed at one end of said pilot sleeve, a head of said pilot piston including a relief orifice which allows a relatively small quantity of pressurized fluid in said pilot chamber to be metered therefrom to fill said adjust chamber;

said adjust chamber having a net surface area greater than that of said retainer whereby said pilot sleeve is moveably urged against said pilot spring to selectively vary the valve operating pressure between the threshold pressure and a maximum valve operating pressure;

a flow control spring positioned in said adjust chamber acting to bias said pilot piston toward a closed position wherein said bypass or return is closed to fluid communication with said pilot chamber and said adjust chamber;

said pilot piston moving against said flow control spring to an initial open position to compress said pilot spring by corresponding movement of said pilot sleeve as soon as fluid flow entering said pilot chamber at the threshold pressure reaches said adjust chamber through said relief orifice;

said pilot piston moving to an intermediate position to further compress said pilot spring as fluid pressure in said pilot chamber increases between the threshold pressure and a maximum operating pressure, fluid in said adjust chamber exiting therefrom through said bypass or return hole from a pilot piston port formed through a side wall of said pilot piston, said pilot piston port being in at least partial alignment with said bypass or return hole when said pilot piston is in the intermediate position;

said pilot piston moving to a maximum position to still further compress said flow control spring when fluid pressure in said pilot chamber reaches the maximum operating pressure, fluid in said adjust chamber and said pilot chamber exiting therefrom to said bypass or return hole through a clearance gap established between said pilot piston and the pilot piston bore when said pilot piston is in the maximum position;

fluid exiting said adjust chamber through said relief orifice into said pilot chamber and through said pilot piston port and said bypass or return hole when fluid pressure in said pilot chamber decreases from the maximum operating pressure.

6. A pilot operated pressure valve as set forth in claim 5, wherein said pilot spring includes:

an inner pilot spring which is pretensioned against said pilot ball, said inner spring increasing the threshold pressure as soon as said pilot chamber and said adjust chamber are filled with pressurized fluid;

an outer pilot spring which is unloaded and untensioned against said pilot ball until fluid pressure in said pilot chamber substantially exceeds the threshold pressure whereupon said inner and outer pilot springs begin to act in parallel unison to maintain said pilot ball seated.

* * * * *